US012149876B2

(12) United States Patent
Ma

(10) Patent No.: US 12,149,876 B2
(45) Date of Patent: Nov. 19, 2024

(54) WIRELESS HEADSET, ASSEMBLY METHOD, ELECTRONIC DEVICE AND STORAGE MEDIUM

(71) Applicant: BEIJING XIAOMI MOBILE SOFTWARE CO., LTD., Beijing (CN)

(72) Inventor: Dong Ma, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 143 days.

(21) Appl. No.: 17/899,300

(22) Filed: Aug. 30, 2022

(65) Prior Publication Data

US 2023/0345160 A1 Oct. 26, 2023

(30) Foreign Application Priority Data

Apr. 22, 2022 (CN) ........................ 202210428277.9

(51) Int. Cl.
*H04R 1/10* (2006.01)

(52) U.S. Cl.
CPC ........... *H04R 1/10* (2013.01); *H04R 2420/07* (2013.01)

(58) Field of Classification Search
CPC ...... H04R 1/1075; H04R 1/1016; H04R 1/10; H04R 2420/07
USPC ........................................................... 381/74
See application file for complete search history.

(56) References Cited

U.S. PATENT DOCUMENTS

| | | | | |
|---|---|---|---|---|
| 9,491,534 | B2 | 11/2016 | Birger et al. | |
| 10,747,337 | B2 | 8/2020 | Belverato | |
| 11,294,466 | B2 * | 4/2022 | Rüdiger ............... | H04R 1/1041 |
| 11,589,150 | B2 * | 2/2023 | Panecki ............... | H04R 1/1016 |
| 2024/0021976 | A1 * | 1/2024 | Yang .................... | H04R 1/1016 |

FOREIGN PATENT DOCUMENTS

| | | | |
|---|---|---|---|
| CN | 201540996 | U | 8/2010 |
| EP | 3934269 | A1 | 1/2022 |

OTHER PUBLICATIONS

European Patent Application No. 22193067.0, extended Search and Opinion dated Jun. 12, 2023, 10 pages.

* cited by examiner

*Primary Examiner* — Disler Paul
(74) *Attorney, Agent, or Firm* — Cozen O'Connor

(57) ABSTRACT

Provided are a wireless headset, an assembly method, an electronic device and a storage medium. The wireless headset includes a housing, a mainboard and a pressure sensitive component. The housing includes: a first chamber defined in a head portion of the wireless headset, and a second chamber defined in a rod portion of the wireless headset and in communication with the first chamber. The mainboard includes: a first circuit board disposed in the first chamber, a second circuit board disposed in the second chamber and provided with a relief portion, and an adapter circuit board disposed in the housing and configured to connect the first circuit board with the second circuit board. The pressure sensitive component is disposed in the second chamber and between the relief portion and the housing.

20 Claims, 6 Drawing Sheets

WIRELESS HEADSET, ASSEMBLY METHOD, ELECTRONIC DEVICE AND STORAGE MEDIUM

CROSS-REFERENCE TO RELATED APPLICATIONS

This application is based upon and claims priority to Chinese Patent Application No. 202210428277.9, filed Apr. 22, 2022, the entire contents of which are incorporated herein by reference.

TECHNICAL FIELD

The present disclosure generally relates to the technical field of smart headsets, and more particularly, to a wireless headset, an assembly method for a wireless headset, an electronic device and a storage medium.

BACKGROUND

Inclusion of headset features such as durability, interactive experience, and bone conduction increases the size and weight of the wireless headset However, the increased size and weight tends to make the headset less comfortable for the user. Lighter and smaller headsets require the stack architecture of the wireless headset to make full use of the limited space of the wireless headset.

In the related art, a feed-back microphone, a loudspeaker, a battery, and a wearing detection component are disposed in a head portion of the wireless headset, which are connected to a mainboard at a rod portion of the headset through an adapter circuit board. Besides the mainboard, the rod portion of the headset is also provided with a pressure sensitive component, an antenna bracket, and other components.

In a limited volume, the pressure sensitive space is often small, so the pressure sensitive region is smaller, such that unintentional touch often occurs. Consequently, it is difficult to capture signals and difficult to control the wireless headset.

SUMMARY

According to a first aspect of embodiments of the present disclosure, there is provided a wireless headset. The wireless headset includes a housing, a mainboard, and a pressure sensitive component. The housing includes: a first chamber defined in a head portion of the wireless headset, and a second chamber defined in a rod portion of the wireless headset and in communication with the first chamber. The mainboard includes: a first circuit board disposed in the first chamber, a second circuit board disposed in the second chamber and provided with a relief portion, and an adapter circuit board disposed in the housing and configured to connect the first circuit board with the second circuit board. The pressure sensitive component is disposed in the second chamber and disposed between the relief portion and the housing.

According to a second aspect of embodiments of the present disclosure, there is provided an assembly method for a wireless headset. The wireless headset includes a housing and a mainboard. The housing includes a first chamber defined in a head portion of the wireless headset, and a second chamber defined in a rod portion of the wireless headset. The mainboard includes a first circuit board, a second circuit board and an adapter circuit board. The assembly method includes: arranging the first circuit board in the first chamber of the housing; arranging the second circuit board in the second chamber of the housing; and arranging the adapter circuit board in the housing for connecting the first circuit board with the second circuit board.

According to a third aspect of embodiments of the present disclosure, there is provided an electronic device. The electronic device includes a processor; and a memory for storing instructions executable by the processor. The processor is configured to implement the assembly method as described in any embodiments hereinbefore.

According to a fourth aspect of embodiments of the present disclosure, there is provided a storage medium. The storage medium has stored therein instructions that, when executed by a processor of a terminal, cause the terminal to implement the assembly method as described in any embodiments hereinbefore.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Figure 1:
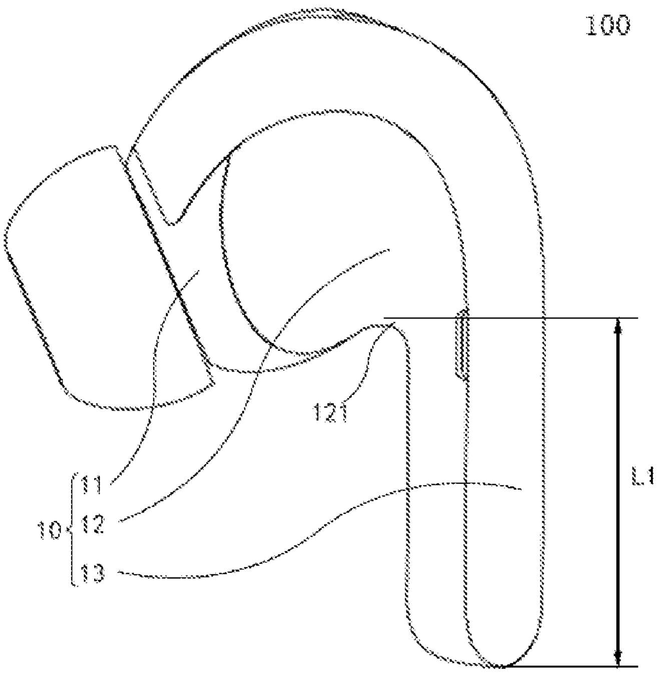
FIG. 1 is a schematic stereogram illustrating a wireless headset according to an embodiment.

Reference Numerals: 100: wireless headset, 10: housing, 11: front housing body, 12: middle housing body, 121: transition portion, 13: rear housing body, 14: loudspeaker, 15: battery, 16: antenna, 101: first chamber, 102: second chamber, 103: first space, 20: mainboard, 21: first circuit board, 22: second circuit board, 23: adapter circuit board, 231: bend portion, 31: first detector, 32: second detector, 40: pressure sensitive component, 41: effective pressure sensitive region.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the development of wireless Bluetooth technology and intellectualization, wireless headsets will play an important role in the fields of wireless connection, voice interaction, intelligent noise reduction, health monitoring, hearing enhancement and protection, so that the wireless headset will not only be a standard configuration for a smart phone, but also even becomes an indispensable part of human organs in the future.

The wireless headset is internally equipped with key components like a loudspeaker, a microphone, a battery, a wearing detection component, a pressure sensitive component, an antenna and a mainboard to achieve the above functions.

In the related art, the feed-back microphone, the loudspeaker, the battery, and the wearing detection component are disposed in a head portion of the wireless headset, which are connected to the mainboard at a rod portion of the headset through an adapter circuit board. Besides the mainboard, the rod portion of the headset is also provided with the pressure sensitive component, an antenna bracket and other components.

Among others, the mainboard is located at the rod portion of the headset, and adopts a design of a double-layer folded rigid-flex board, which has a complex structure and takes up a large space, resulting in that the whole rod portion of the headset has large sizes in length, width and thickness directions, which not only affects the wearing comfort, but also runs counter to the small and exquisite appearance design trend of the wireless headset.

Moreover, the space in the head portion of the headset is not fully utilized, and the battery has a small volume and a limited capacity, so that the endurance of the battery is short. The wearing detection uses an infrared range sensor and a capacitive sensor, and a distance between these two sensors is relatively close, so both sensors may be unintentionally triggered to cause the headset to respond when the wireless headset is handheld.

In the related art, the rod portion of the wireless headset has a total length of 27.4 mm, a pressure sensitive length of 14 mm, and a length of an effective pressure sensitive region of 8 mm, so the effective pressure sensitive region accounts for 29% of the total length of the rod portion of the wireless headset, and the problem of invalid press is easy to occur, and the use experience is poor.

In order to overcome the problems existing in related art, the present disclosure provides a wireless headset, an assembly method for a wireless headset, an electronic device, and a storage medium.

According to a first aspect of embodiments of the present disclosure, there is provided a wireless headset. The wireless headset includes a housing, a mainboard and a pressure sensitive component. The housing includes: a first chamber defined in a head portion of the wireless headset, and a second chamber defined in a rod portion of the wireless headset and in communication with the first chamber. The mainboard includes: a first circuit board disposed in the first chamber, a second circuit board disposed in the second chamber and provided with a relief portion, and an adapter circuit board disposed in the housing and configured to connect the first circuit board with the second circuit board. The pressure sensitive component is disposed in the second chamber and disposed between the relief portion and the housing.

In some embodiments, the wireless headset further includes a loudspeaker and a battery. The battery is disposed in the first chamber and arranged at a side of the first circuit board in a thickness direction of the first circuit board. The loudspeaker is disposed at a side of the battery opposite to the first circuit board. The battery is arranged in parallel to the first circuit board.

In some embodiments, a first side face of the battery is close to an inner wall of the first chamber, a second side face of the battery is away from the inner wall of the first chamber and separated from the inner wall of the first chamber by a first space, and elements on the first circuit board are arranged in the first space.

In some embodiments, the wireless headset further includes an antenna. The antenna is disposed in the second chamber and attached to the housing. The pressure sensitive component is disposed between the relief portion and the antenna and connected to the antenna.

In some embodiments, the wireless headset further includes a pressure sensitive lead. The pressure sensitive lead is disposed in the second chamber and configured to connect the pressure sensitive component with the second circuit board.

In some embodiments, the pressure sensitive component comprises an effective pressure sensitive region; a length direction of the effective pressure sensitive region is parallel to that of the second chamber; and a ratio of a length of the effective pressure sensitive region to that of the second chamber is greater than or equal to 0.5.

In some embodiments, the housing includes a front housing body, a middle housing body and a rear housing body. The front housing body, a portion of the middle housing body, and a portion of the rear housing body together define the first chamber. Another portion of the middle housing body and another portion of the rear housing body together define the second chamber.

In some embodiments, the adapter circuit board includes a bend portion, and the bend portion is attached to an inner wall of a middle housing body. The wireless headset further includes a first positioning element and a second positioning element both disposed in the housing, the first circuit board is fixed in the first chamber by the first positioning element, and the second circuit board is fixed in the second chamber by the second positioning element.

In some embodiments, the wireless headset further includes a first detector and a second detector. The first detector and the second detector are disposed opposite to each other in the first chamber.

In some embodiments, the wireless headset further includes a bracket, and the bracket is disposed in the first chamber and attached to an inner wall of the first chamber. The first detector and the second detector are disposed opposite to each other on the bracket.

According to a second aspect of embodiments of the present disclosure, there is provided an assembly method for a wireless headset. The wireless headset includes a housing and a mainboard. The housing includes a first chamber defined in a head portion of the wireless headset, and a second chamber defined in a rod portion of the wireless headset. The mainboard includes a first circuit board, a second circuit board and an adapter circuit board. The assembly method includes: arranging the first circuit board in the first chamber of the housing; arranging the second circuit board in the second chamber of the housing; and arranging the adapter circuit board in the housing for connecting the first circuit board with the second circuit board.

In some embodiments, the assembly method further includes: arranging a battery in the first chamber and at a side of the first circuit board in a thickness direction of the first circuit board; and providing a loudspeaker at a side of the battery opposite to the first circuit board. The battery is arranged in parallel to the first circuit board.

In some embodiments, the assembly method further includes: bending at least a part of the adapter circuit board to form a bend portion; and attaching the bend portion to an inner wall of the housing.

According to a third aspect of embodiments of the present disclosure, there is provided an electronic device. The electronic device includes a processor; and a memory for storing instructions executable by the processor. The processor is configured to implement the assembly method as described in any embodiments hereinbefore.

According to a fourth aspect of embodiments of the present disclosure, there is provided a storage medium. The storage medium has stored therein instructions that, when executed by a processor of a terminal, cause the terminal to implement the assembly method as described in any embodiments hereinbefore.

In the wireless headset according to embodiments of the present disclosure, the first circuit board is disposed in the first chamber, and the second circuit board is disposed in the second chamber, which reduces the stacking compactness in the rod portion of the wireless headset, and makes the overall structure of the wireless headset smaller and exquisite.

As illustrated in FIG. 1 to FIG. 9, according to a first aspect of embodiments of the present disclosure, there is provided a wireless headset 100. The wireless headset 100 includes a housing 10, a mainboard 20 and a pressure sensitive component 40.

The housing 10 includes a first chamber 101 defined in a head portion of the wireless headset 100 and a second chamber 102 defined in a rod portion of the wireless headset 100. The first chamber 101 and the second chamber 102 are communicated with each other. The mainboard 20 includes a first circuit board 21, a second circuit board 22 and an adapter circuit board 23.

The first circuit board 21 is disposed in the first chamber 101, the second circuit board 22 is disposed in the second chamber 102, and the adapter circuit board 23 is disposed in the housing 10 and configured to connect the first circuit board 21 with the second circuit board 22.

Figure 3:
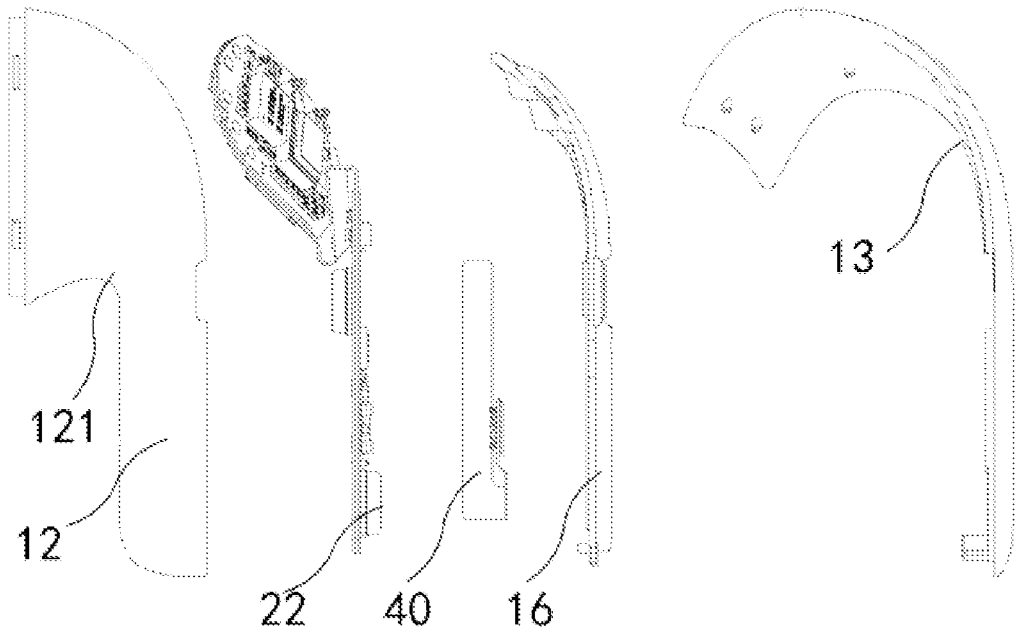
FIG. 3 is an explosive view illustrating a wireless headset according to an embodiment.

The pressure sensitive component 40 is disposed in the second chamber 102. The second circuit board 22 is provided with a relief portion (not shown). The pressure sensitive component 40 is disposed between the relief portion and the housing 10. Specifically, as illustrated in FIG. 3, the second chamber 102 is provided with the pressure sensitive component 40. In the present disclosure, since the first circuit board 21 is arranged in the first chamber 101 at the head portion of the wireless headset 100, the space of the second chamber 102 occupied by the second circuit board 22 may be reduced appropriately to leave sufficient space for the pressure sensitive component 40, which effectively improves the utilization rate of the second chamber 102 and increases the volume of the pressure sensitive component 40.

Specifically, in embodiments of the present disclosure, the second circuit board 22 is provided with the relief portion, and the pressure sensitive component 40 is disposed between the relief portion and the housing 10, which improves the safety of the pressure sensitive component 40 and the second circuit board 22, and avoids direct contact between the pressure sensitive component 40 and the circuit on the second circuit board 22, and thus avoids false trigger of signals.

Figure 2:
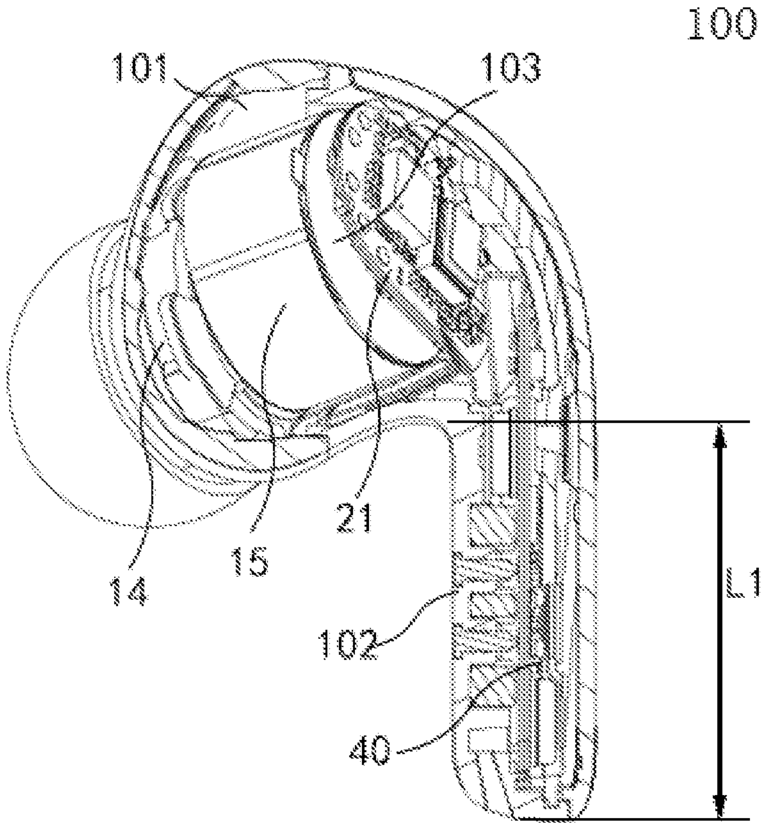
FIG. 2 is a schematic diagram illustrating a wireless headset according to an embodiment.

Specifically, as illustrated in FIG. 1 to FIG. 2, the wireless headset 100 includes the housing 10, the housing 10 has a chamber, the chamber includes the first chamber 101 located at the head portion of the wireless headset 100 and the second chamber 102 located at the rod portion of the wireless headset 100. The first chamber 101 and the second chamber 102 are communicated with each other.

In the present disclosure, the mainboard 20 is composed of three portions. Specifically, the mainboard 20 includes the first circuit board 21, the second circuit board 22 and the adapter circuit board 23. The first circuit board 21 may be disposed in the first chamber 101, the second circuit board 22 may be disposed in the second chamber 102, and the adapter circuit board 23 may be disposed in the housing 10 and configured to connect the first circuit board 21 with the second circuit board 22.

Therefore, as compared with the existing design where the entire mainboard 20 is arranged in the first chamber 101, embodiments of the present disclosure adopt a rigid-flex board to form the mainboard 20, the first circuit board 21 of the mainboard 20 is arranged in the first chamber 101, and the second circuit board 22 of the mainboard 20 is arranged in the second chamber 102, which reduce the stacking compactness in the rod portion of the wireless headset 100, and make the overall structure of the wireless headset 100 smaller and exquisite.

To sum up, embodiments of the present disclosure have the following advantageous technical effects. In the wireless headset 100 according to embodiments of the present disclosure, by arranging the first circuit board 21 in the first chamber 101 and arranging the second circuit board 22 in the second chamber 102, the stacking compactness in the rod portion of the wireless headset 100 is reduced, the overall structure of the wireless headset is smaller and exquisite.

It is to be understood that both the foregoing general description and the following detailed description are exemplary and explanatory only and are not restrictive of the present disclosure.

In some embodiments, as illustrated in FIG. 2, the wireless headset 100 further includes a loudspeaker 14 and a battery 15. The battery 15 is disposed in the first chamber 101 and arranged at a side of the first circuit board 21 in a thickness direction of the first circuit board 21. The loudspeaker 14 is disposed at a side of the battery 15 opposite to the first circuit board 21. The battery 15 is arranged in parallel to the first circuit board 21.

Specifically, as illustrated in FIG. 2, in the thickness direction of the first circuit board 21 (such as a thickness direction of the first circuit board 21 shown in FIG. 2), the battery 15 is arranged in parallel to the first circuit board 21, and the battery 15 abuts against a side face of the first circuit board 21.

Moreover, the loudspeaker 14 is arranged in parallel to the first circuit board 21 and abuts against a side face of the battery 15. In this way, the loudspeaker 14, the battery 15 and the first circuit board 21 are arranged in the first chamber 101 more compactly.

To sum up, in embodiments of the present disclosure, by arranging the loudspeaker 14, the battery 15 and the first circuit board 21 in parallel in the first chamber 101, the space utilization of the first chamber 101 is improved, and the volume of the battery 15 is effectively increased to extend the endurance of the wireless headset 100 in the case the head volume of the wireless headset 100 remains unchanged.

In some embodiments, a first side face of the battery 15 is close to an inner wall of the first chamber 101, a second side face of the battery 15 is away from the inner wall of the first chamber 101 and separated from the inner wall of the first chamber 101 by a first space 103, and elements on the first circuit board 21 are arranged in the first space 103.

It is to be understood that, to fit the human ear and improve the wearing comfort, the head portion of the headset usually has an irregular structure, that is, the first chamber 101 has an irregular structure.

Specifically, as illustrated in FIG. 2, in embodiments of the present disclosure, the loudspeaker 14, the battery 15 and the first circuit board 21 are arranged in parallel in the first chamber 101, and the battery 15 is arranged away from the first circuit board 21 as far as possible, so that the first side face of the battery 15 is close to the inner wall of the first chamber 101, and the second side face of the battery 15 is away from the inner wall of the first chamber 101, such that the first space 103 is present between the second side face of the battery 15 and the inner wall of the first chamber 101.

The first circuit board 21 may be disposed in the first space 103, and various elements (such as a chip, a connector, a metal dome, bone conduction, a noise reduction microphone and a call microphone and the like) on the first circuit board 21 may also be disposed in the first space 103.

In this way, an element arrangement area in the first chamber 101 of the wireless headset 100 is significantly increased, which provides great convenience for the layout and design of the wireless headset 100.

In some embodiments of the present disclosure, in order to make full use of the space in the first chamber 101 of the wireless headset 100, when the architecture is stacked, the loudspeaker 14 is rotated by a certain angle relative to a plane of a sound hole, and then the battery 15 and the first circuit board 21 are arranged in parallel to an upper surface of the loudspeaker 14. Through repeated debugging, an angle at which the first circuit board 21 has the largest area is selected. Afterwards, the position of the battery 15 is adjusted to make a side wall of the battery 15 close to a side of the housing 10, leaving a large enough gap relative to another side of the housing 10 to increase the element arrangement area for the first circuit board 21.

In some embodiments, the housing 10 includes a front housing body 11, a middle housing body 12 and a rear housing body 13. The front housing body 11, a portion of the middle housing body 12 and a portion of the rear housing body 13 together define the first chamber 101. Another portion of the middle housing body 12 and another portion of the rear housing body 13 together define the second chamber 102.

Specifically, as illustrated in FIG. 1 to FIG. 3, the housing 10 is specifically composed of three portions, i.e., the front housing body 11, the middle housing body 12 and the rear housing body 13. The front housing body 11, the middle housing body 12 and the rear housing body 13 are connected one another. In embodiments of the present disclosure, by arranging the front housing body 11, the middle housing body 12 and the rear housing body 13 which are independent from each other, the assembly method and the assembly process of the housing 10 are more flexible.

In some embodiments, the adapter circuit board 23 has a bend portion 231, and the bend portion 231 is attached to the inner wall of the middle housing body 12. The wireless headset 100 further includes a first positioning element (not shown) and a second positioning element (not shown), both of which are disposed in the housing 10. The first circuit board 21 is fixed in the first chamber 101 by the first positioning element, and the second circuit board 22 is fixed in the second chamber 102 by the second positioning element.

Further, in embodiments of the present disclosure, the battery 15 may be cylindrical or special-shaped, so that the battery 15 fits better with the head portion of the headset, the center of gravity is closer to the head portion of the headset, and the battery capacity is increased.

Figure 4:
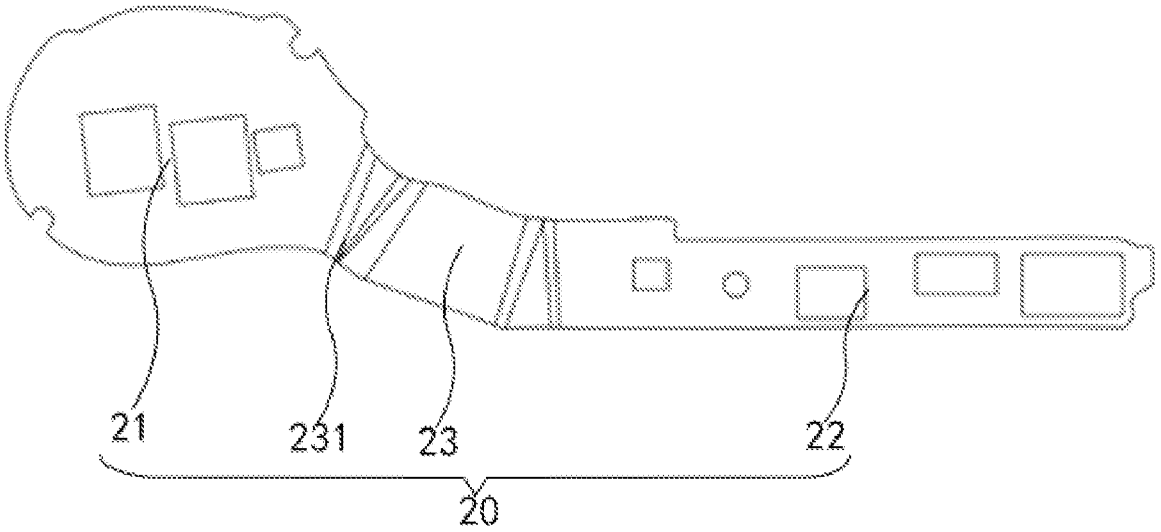
FIG. 4 is a schematic diagram illustrating a mainboard of a wireless headset according to an embodiment.
Figure 5:
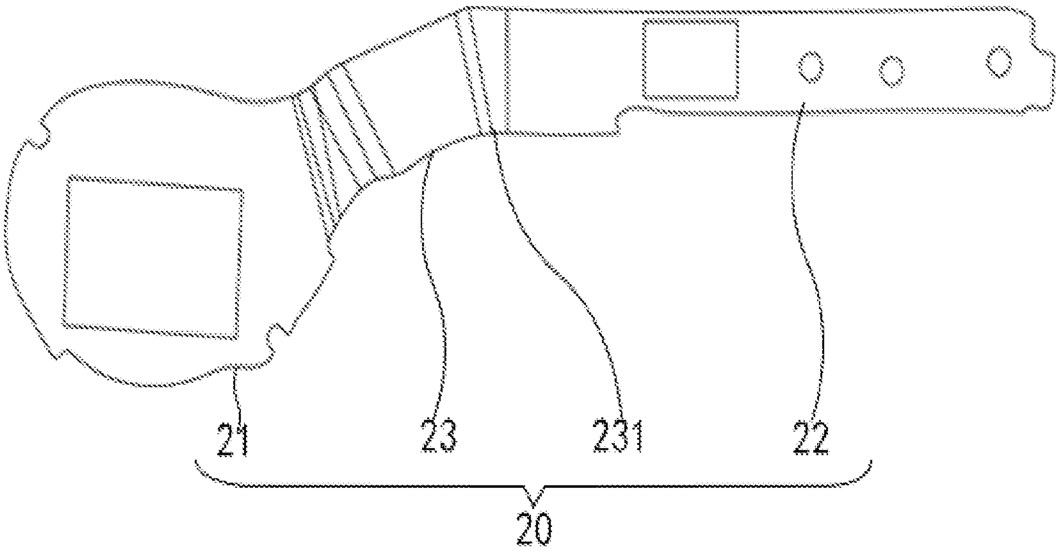
FIG. 5 is a schematic diagram illustrating a mainboard of a wireless headset according to an embodiment.

Specifically, as shown in FIG. 4 to FIG. 5, the adapter circuit board 23 substantially has a strip structure, and the adapter circuit board 23 is configured to connect the first circuit board 21 with the second circuit board 22 to make the first circuit board 21 in data communication with the second circuit board 22.

In embodiments of the present disclosure, the middle housing body 12 has a transition portion 121, and the transition portion 121 is generally arc-shaped. The adapter circuit board 23 has a bend portion 231, and the shape of the bend portion 231 is substantially consistent with that of the transition portion 121. Therefore, the adapter circuit board 23 may be attached on the middle housing body 12, so as to make the attachment between the adapter circuit board 23 and the middle housing body 12 more tightly, thereby improving the stability of the adapter circuit board 23 in the housing 10.

Furthermore, the middle housing body 12 is provide with the first positioning element (not shown) and the second positioning element (not shown). The first positioning element is used to fix the first circuit board 21 in the first chamber 101, and the second positioning element is used to fix the second circuit board 22 in the second chamber 102.

It should be noted that in the present disclosure, the structure of the first positioning element may be the same as or different from that of the second positioning element. In addition, the number of the first positioning element and that of the second positioning element may be set by those skilled in the art as required.

In some embodiments, the first positioning piece and the second positioning piece each may be a positioning column or a positioning rib.

In some embodiments, the wireless headset 100 further includes a first detector 31 and a second detector 32. The first detector 31 and the second detector 32 are disposed opposite to each other in the first chamber 101, so as to make the first detector 31 and the second detector 32 fit human ear.

Figure 6:
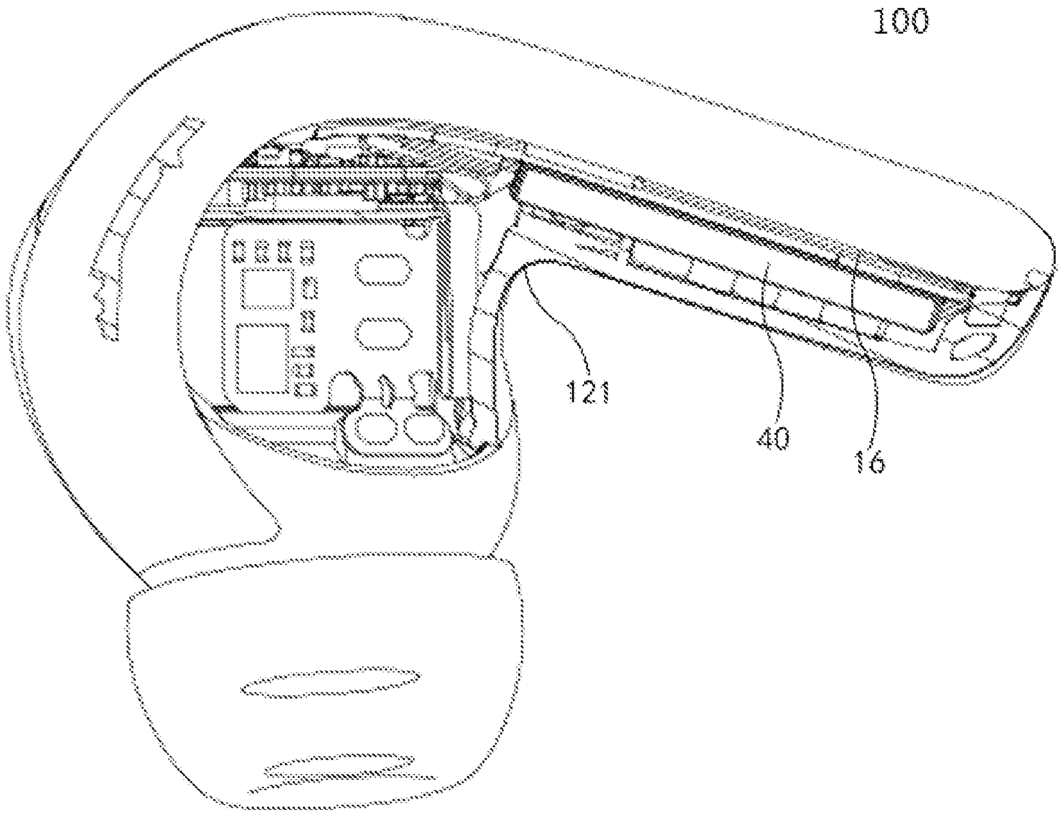
FIG. 6 is a schematic diagram illustrating a first detector and a second detector of a wireless headset according to an embodiment.
Figure 7:
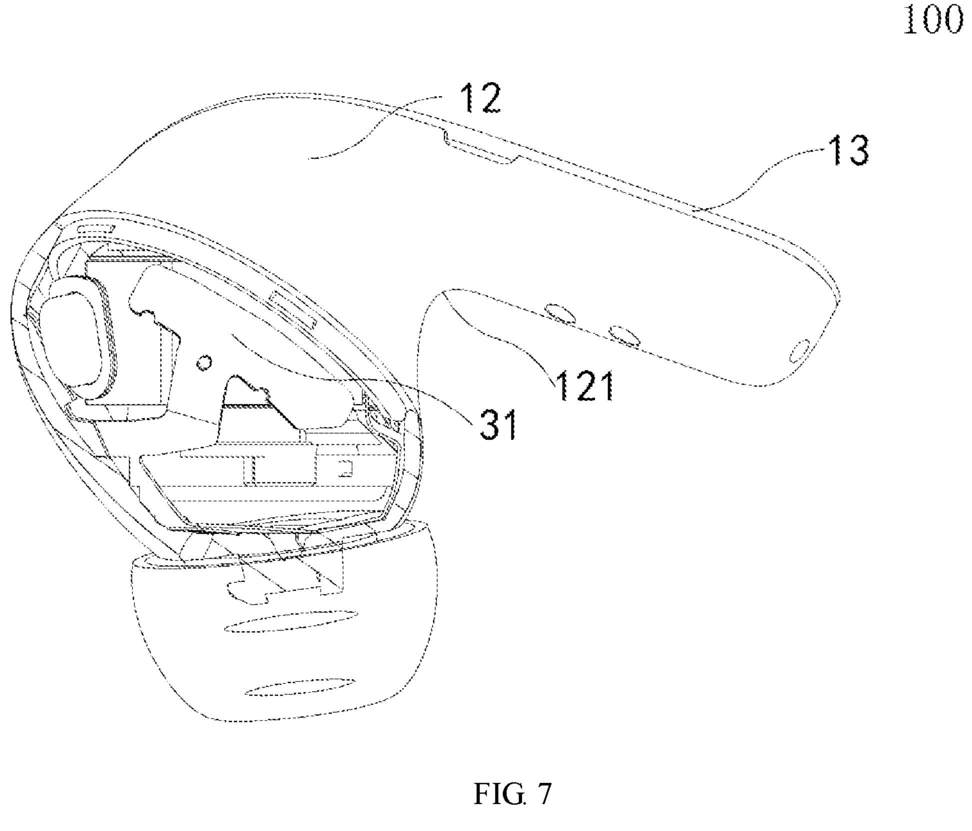
FIG. 7 is a schematic diagram illustrating a first detector and a second detector of a wireless headset according to an embodiment.
Figure 8:
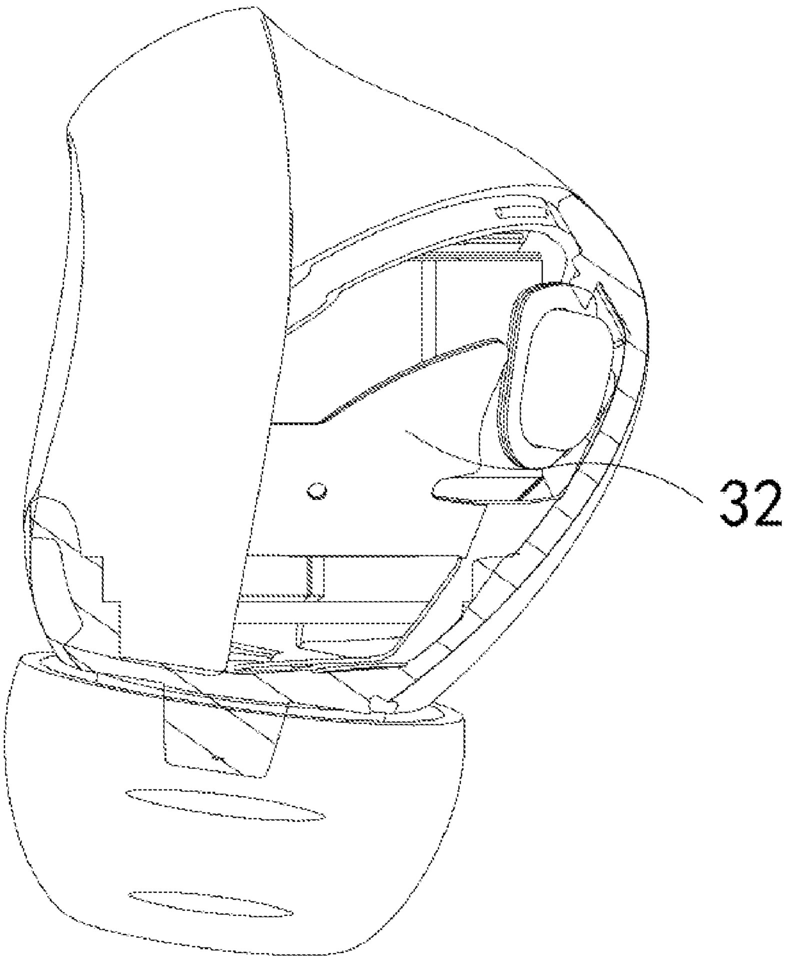
FIG. 8 is a schematic diagram illustrating a first detector and a second detector of a wireless headset according to an embodiment.

Specifically, as illustrated in FIG. 6, the head portion of the wireless headset 100 may be placed in human ear to fix the wireless headset 100 in the human ear.

It should be noted that the wearing detection adopts dual-channel capacitive in-ear detection with the following principle. When the wireless headset is worn, coupling capacitance is generated between the human body and the in-ear detection sensors (hereinafter referred to as "sensors") and the system, and a capacitance between the sensors and the system is changed. By detecting the capacitance change through a chip, it is determined whether the wireless headset is worn or falls off In order to reduce the probability of unintentional trigger, the design of the wireless headset needs to meet that both sensors will be triggered when the wireless headset is worn normally, but they will not be triggered at the same time when the wireless headset is held, stored, grabbed, which has higher requirements for the location selection of the sensors.

In the present disclosure, an actual contact region between the human body and the wireless headset 100 when the wireless headset 100 is worn may be taken as a reference range, and a suitable position may be selected within this reference range. An area of the detectors is maximized to ensure the signal quantity and wearing stability. Moreover, a distance between the two detectors shall be maximized to ensure that the probability of unintentional trigger is less than 5% when the wireless headset is handheld normally, stored, put into or get out of the storing box.

In some embodiments, the wireless headset 100 further includes a bracket. The bracket is disposed in the first chamber 101 and attached to the inner wall of the first chamber 101. The first detector 31 and the second detector 32 are disposed opposite to each other on the bracket.

Specifically, as illustrated in FIG. 6, the first chamber 101 is provided with the bracket, and the shape of the bracket is substantially consistent with that of the first chamber 101. Therefore, the bracket may be attached to the inner wall of the first chamber 101, and the first detector 31 and the second detector 32 are disposed opposite to each other on the bracket.

In some embodiments, the wireless headset 100 further includes an antenna 16, and the antenna 16 is disposed in the second chamber 102 and attached to the housing 10. The pressure sensitive component 40 is disposed between the relief portion and the antenna 16 and connected to the antenna 16.

As illustrated in FIG. 3, in embodiments of the present disclosure, the wireless headset 100 also includes an antenna 16, and the antenna 16 is disposed in the second chamber 102 and arranged between the pressure sensitive component 40 and the rear housing body 13. The antenna 16 is in data communication with the pressure sensitive component 40.

In some embodiments, the wireless headset 100 further includes a pressure sensitive lead (not shown), and the pressure sensitive lead is disposed in the second chamber 102 and configured to connect the pressure sensitive component 40 with the second circuit board 22.

It is to be understood that in embodiments of the present disclosure, data connection between the pressure sensitive component 40 and the second circuit board 22 is realized by through the pressure sensitive lead, and the pressure sensitive lead is disposed in the second chamber 102.

In some embodiments, the pressure sensitive component 40 includes an effective pressure sensitive region 41, a length direction of the effective pressure sensitive region 41 is parallel to that of the second chamber 102; and a ratio of a length of the effective pressure sensitive region 41 to that of the second chamber 102 is greater than or equal to 0.5.

Figure 9:
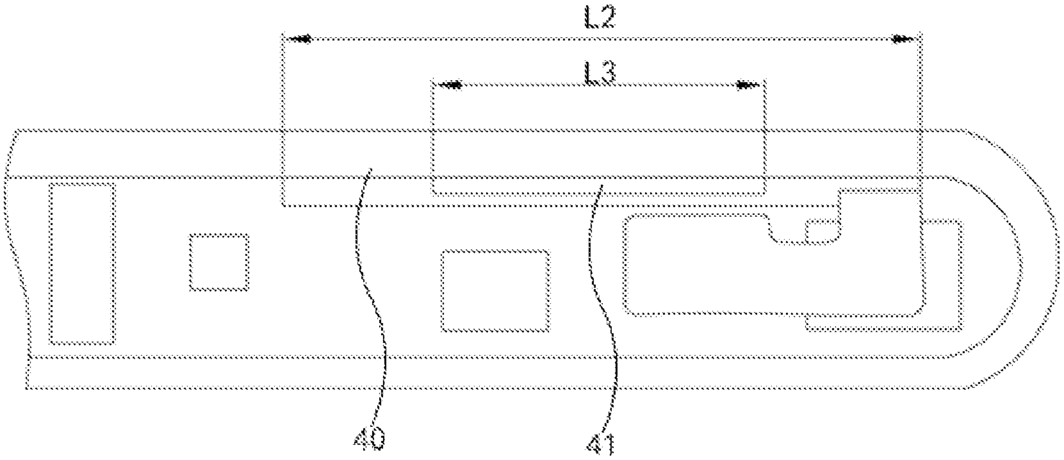
FIG. 9 is a schematic diagram illustrating a pressure sensitive component of a wireless headset according to an embodiment.

Specifically, as illustrated in FIG. 9, the length of the pressure sensitive component 40 is represented by L2, and the length of the effective pressure sensitive region 41 is represented by L3. As illustrated in FIG. 1 to FIG. 2, a length of the rod portion of the wireless headset 100 is represented by L1. In embodiments of the present disclosure, $L3/L1 \geq 0.5$.

It is to be understood that the length of the effective pressure sensitive region 41 accounts for 50% or more of the length of the rod portion of the wireless headset 100, which greatly reduces the risk of invalid press.

In an example of the present disclosure, the length of the rod portion of the wireless headset 100 is 16.8 mm, the length of the pressure sensitive component 40 is 14 mm, and the length of the effective pressure sensitive region 41 is 8.5 mm, so the ratio of the length of the effective pressure sensitive region 41 to that of the rod portion of the wireless headset 100 is 8.5/16.8=0.506.

According to a second aspect of embodiments of the present disclosure, there is provided an assembly method for a wireless headset 100. The wireless headset 100 includes a housing 10 and a mainboard 20. The housing 10 includes a first chamber 101 defined in a head portion of the wireless headset 100 and a second chamber 102 defined in a rod portion of the wireless headset 100. The mainboard 20 includes a first circuit board 21, a second circuit board 22 and an adapter circuit board 23. The assembly method for the wireless headset 100 includes: arranging the first circuit board 21 in the first chamber 101 of the housing 10; arranging the second circuit board 22 in the second chamber 102 of the housing 10; and arranging the adapter circuit board 23 in the housing 10 for connecting the first circuit board 21 with the second circuit board 22.

It is to be understood that, as compared with the existing design where the entire mainboard 20 is arranged in the first chamber 101, embodiments of the present disclosure adopt a rigid-flex board to form the mainboard 20, the first circuit board 21 of the mainboard 20 is arranged in the first chamber 101, and the second circuit board 22 of the mainboard 20 is arranged in the second chamber 102, which reduce the stacking compactness in the rod portion of the wireless headset 100, and make the overall structure of the wireless headset 100 smaller and exquisite.

In some embodiments, in the first chamber 101, along an axial direction of the first circuit board 21, the battery 15 is arranged below the first circuit board 21, and the loudspeaker 14 is arranged below the battery 15.

Specifically, as illustrated in FIG. 2, in the axial direction of the first circuit board 21 (such as a thickness direction of the first circuit board 21 shown in FIG. 2), the battery 15 is arranged in parallel to the first circuit board 21 and abuts against a side face of the first circuit board 21.

Moreover, the loudspeaker 14 is arranged in parallel to the first circuit board 21 and abuts against a side face of the battery 15. In this way, the loudspeaker 14, the battery 15 and the first circuit board 21 are arranged in the first chamber 101 more compactly.

To sum up, in embodiments of the present disclosure, by arranging the loudspeaker 14, the battery 15 and the first circuit board 21 in parallel in the first chamber 101, the space utilization of the first chamber 101 is improved, and the volume of the battery 15 is effectively increased to extend the endurance of the wireless headset 100 in the case the head volume of the wireless headset 100 remains unchanged.

In some embodiments, the assembly method further includes: bending at least a part of the adapter circuit board 23 to form a bend portion 231; and attaching the bend portion 231 to an inner wall of the housing 10.

Specifically, as illustrated in FIG. 4 to FIG. 5, the adapter circuit board 23 substantially has a strip structure, and the adapter circuit board 2 is configured to connect the first circuit board 21 with the second circuit board 22 to make the first circuit board 21 in data communication with the second circuit board 22.

In embodiments of the present disclosure, the middle housing body 12 has a transition portion 121, and the transition portion 121 is generally arc-shaped. The adapter circuit board 23 has a bend portion 231, and the shape of the bend portion 231 is substantially consistent with that of the transition portion 121. Therefore, the adapter circuit board 23 may be attached on the middle housing body 12, so as to make the attachment between the adapter circuit board 23 and the middle housing body 12 more tightly, thereby improving the stability of the adapter circuit board 23 in the housing 10.

Figure 10:
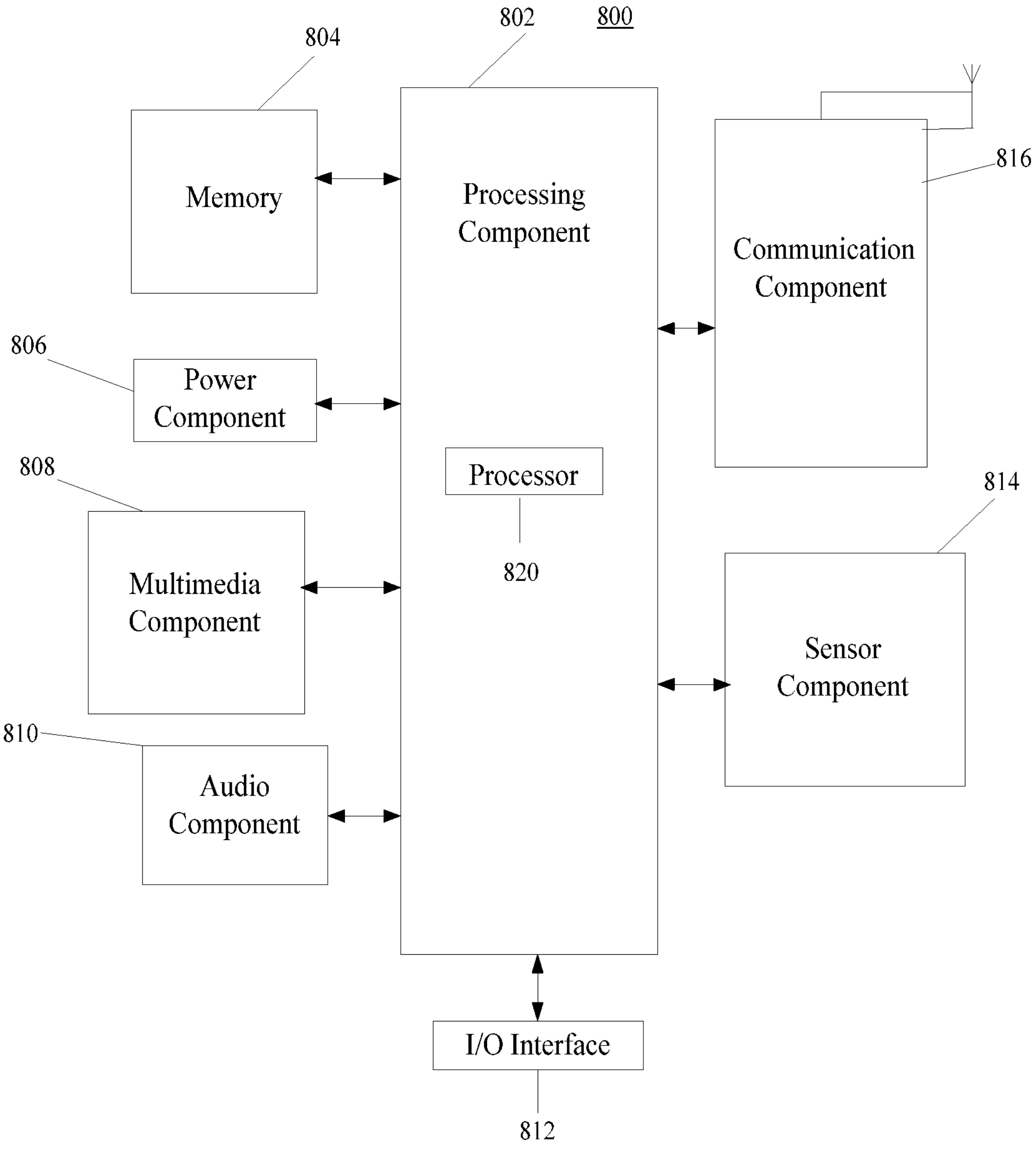
FIG. 10 is a schematic diagram illustrating an electronic device according to an embodiment.

As illustrated in FIG. 10, according to a third aspect of embodiments of the present disclosure, there is provided an electronic device 800. The electronic device 800 includes a processor 820; and a memory 804 for storing instructions executable by the processor 820. The processor 820 is configured to implement the assembly method as described in any embodiments above.

Specifically, FIG. 10 is a block diagram illustrating an electronic device 800 according to an embodiment. For example, the electronic device 800 may be a mobile phone, a computer, a digital broadcast terminal, a messaging device, a gaming console, a tablet, a medical device, exercise equipment, a personal digital assistant, and the like.

Referring to FIG. 10, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the electronic device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the electronic device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the electronic device 800, relative positioning of components, e.g., the display and the keypad, of the electronic device 800, a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 can access a wireless network based on a communication standard, such as WiFi, 2G 3G 4G 5G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the electronic device 800, for performing the above-described methods. For example, the non-transitory computer-readable storage medium may be a ROM, a RAM, a CD-ROM, a magnetic tape, a floppy disc, an optical data storage device, and the like.

According to a fourth aspect of embodiments of the present disclosure, there is provided a storage medium having stored therein instructions that, when executed by a processor of a terminal, cause the terminal to implement the assembly method as described in any embodiments above.

It is to be understand that the term "a plurality of" used herein means two or more than two, and the same is true for other quantifiers. The term "and/or" represents and contains any one and all possible combinations of one or more associated listed items. For example, "A and/or B" may indicate A alone, B alone or the presence of both A and B. The character "I" generally indicates an "or" relationship between the indicated objects before and after this character. In addition, "a", "an", "the" and "said" in singular forms are intended to include plural forms, unless clearly indicated in the context otherwise.

It is to be further understand that the terms such as "first", "second" and the like are used herein for describing various kinds of information, but these information should not be limited to these terms. These terms are only used for distinguishing the same type of information from each other, and do not indicate a specific order or relative importance. In fact, the expressions "first" and "second" are interchangeable. For example, without departing from the scope of the present disclosure, the first information may also be referred to as the second information, and similarly, the second information may also be referred to as the first information.

It is to be further understand that terms such as "central", "longitudinal", "lateral", "length", "width", "thickness", "upper", "lower", "front", "rear", "left", "right", "vertical", "horizontal", "top", "bottom", "inner", and "outer" should be construed to refer to the orientation or position relationship as then described or as shown in the drawings under discussion. These relative terms are for convenience and simplification of description, and do not require or imply that the indicated device or element has a particular orientation or has to be constructed or operated in a particular orientation.

It is to be further understand that, unless otherwise specified, the term "connection" includes not only the direct connection between two indicated elements without other elements, but also the indirect connection via other elements.

It is to be further understand that, although operations of embodiments of the present disclosure are described in a specific sequence in the drawings, they are not intended to require that these operations have to be performed in the specific order or serial sequence as shown, or that all the shown operations need to be performed to achieve the desired results. Multitasking and parallel processing may be advantageous in a particular environment. Multitasking and parallel processing may be advantageous in a particular environment.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A wireless headset, comprising:

a housing, comprising:

a first chamber, defined in a head portion of the wireless headset, and a second chamber, defined in a rod portion of the wireless headset and in communication with the first chamber;

a mainboard, comprising:

a first circuit board, disposed in the first chamber, a second circuit board, disposed in the second chamber and provided with a relief portion, and an adapter circuit board, disposed in the housing and electrically connecting the first circuit board to the second circuit board;

a pressure sensitive component, disposed in the second chamber and disposed between the relief portion and the housing;

a battery, disposed in the first chamber, and arranged at a side of the first circuit board in a thickness direction of the first circuit board; and a loudspeaker, disposed at a side of the battery opposite to the first circuit board.

2. The wireless headset according to claim 1, wherein a first side face of the battery faces an inner wall of the first chamber, a second side face of the battery, opposite the first side face, faces away from the inner wall of the first chamber and is separated from the inner wall of the first chamber by a first space, and elements on the first circuit board are arranged in the first space.

3. The wireless headset according to claim 1, further comprising an antenna disposed in the second chamber and attached to the housing, wherein the pressure sensitive component is disposed between the relief portion and the antenna and connected to the antenna.

4. The wireless headset according to claim 1, further comprising a pressure sensitive lead, disposed in the second chamber, that connects the pressure sensitive component with the second circuit board.

5. The wireless headset according to claim 1, wherein the pressure sensitive component comprises an effective pressure sensitive region;

a length direction of the effective pressure sensitive region is parallel to that of the second chamber; and a ratio of a length of the effective pressure sensitive region to that of the second chamber is greater than or equal to 0.5.

6. The wireless headset according to claim 1, wherein the housing comprises a front housing body, a middle housing body, and a rear housing body;

the front housing body, a portion of the middle housing body, and a portion of the rear housing body together define the first chamber; and another portion of the middle housing body and another portion of the rear housing body together define the second chamber.

7. The wireless headset according to claim 1, wherein the adapter circuit board comprises a bend portion attached to an inner wall of a middle housing body; and the wireless headset further comprises a first positioning element and a second positioning element both disposed in the housing, the first circuit board is fixed in the first chamber by the first positioning element, and the second circuit board is fixed in the second chamber by the second positioning element.

8. The wireless headset according to claim 7, wherein the middle housing body comprises a transition portion, and a shape of the bend portion is substantially consistent with that of the transition portion.

9. The wireless headset according to claim 1, further comprising:

a first detector, disposed in the first chamber; and a second detector, disposed in the first chamber and opposite to the first detector.

10. The wireless headset according to claim 9, further comprising: a bracket disposed in the first chamber and attached to an inner wall of the first chamber, wherein the first detector and the second detector are disposed opposite to each other on the bracket.

11. The wireless headset according to claim 1, wherein the relief portion prevents direct contact between the pressure sensitive component and a circuit on the second circuit board.

12. The wireless headset according to claim 1, wherein in the thickness direction of the first circuit board, the battery is arranged in parallel to the first circuit board, and the battery abuts against the first circuit board.

13. The wireless headset according to claim 12, wherein the loudspeaker is arranged in parallel to the first circuit board and abuts against the battery.

14. An assembly method for a wireless headset, wherein the wireless headset comprises a housing and a mainboard, the housing comprises a first chamber defined in a head portion of the wireless headset and a second chamber defined in a rod portion of the wireless headset, and the mainboard comprises a first circuit board, a second circuit board and an adapter circuit board;

wherein the assembly method comprises:

arranging the first circuit board in the first chamber of the housing;

arranging the second circuit board in the second chamber of the housing;

arranging the adapter circuit board in the housing for connecting the first circuit board with the second circuit board;

arranging a battery in the first chamber and at a side of the first circuit board in a thickness direction of the first circuit board; and providing a loudspeaker at a side of the battery opposite to the first circuit board.

15. The assembly method according to claim 14, further comprising:

bending at least a part of the adapter circuit board to form a bend portion; and attaching the bend portion to an inner wall of the housing.

16. An electronic device, comprising:

a processor; and a memory for storing instructions executable by the processor, wherein the processor implements an assembly method for a wireless headset, wherein the wireless headset comprises a housing and a mainboard, the housing comprises a first chamber defined in a head portion of the wireless headset and a second chamber defined in a rod portion of the wireless headset, and the mainboard comprises a first circuit board, a second circuit board and an adapter circuit board;

wherein the assembly method comprises:

arranging the first circuit board in the first chamber of the housing;

arranging the second circuit board in the second chamber of the housing;-and arranging the adapter circuit board in the housing for connecting the first circuit board with the second circuit board;

arranging a battery in the first chamber and at a side of the first circuit board in a thickness direction of the first circuit board; and providing a loudspeaker at a side of the battery opposite to the first circuit board.

17. The electronic device according to claim 16, wherein the assembly method further comprises:

arranging the battery in parallel to the first circuit board.

18. The electronic device according to claim 16, wherein the assembly method further comprises:

bending at least a part of the adapter circuit board to form a bend portion; and attaching the bend portion to an inner wall of the housing.

19. A non-transitory computer-readable storage medium having stored therein instructions that, when executed by a processor of a terminal, cause the terminal to implement the assembly method for the wireless headset according to claim 14.

20. A non-transitory computer-readable storage medium having stored therein instructions that, when executed by a processor of a terminal, cause the terminal to implement the assembly method for the wireless headset according to claim 15.

* * * * *